(12) United States Patent
Park

(10) Patent No.: US 7,805,061 B2
(45) Date of Patent: Sep. 28, 2010

(54) STRUCTURE OF NAVIGATION INFORMATION FOR VIDEO DATA RECORDED ON A RECORDING MEDIUM AND RECORDING AND REPRODUCING METHODS AND APPARATUSES USING THE STRUCTURE

(75) Inventor: Sung Wan Park, Suwon-si (KR)

(73) Assignee: LG Electronics, Inc., Seoul (KR)

( * ) Notice: Subject to any disclaimer, the term of this patent is extended or adjusted under 35 U.S.C. 154(b) by 1264 days.

(21) Appl. No.: 11/294,428

(22) Filed: Dec. 6, 2005

(65) Prior Publication Data

US 2006/0127042 A1 Jun. 15, 2006

(30) Foreign Application Priority Data

Dec. 9, 2004 (KR) .................... 10-2004-0103494

(51) Int. Cl.
*H04N 5/00* (2006.01)
*H04N 7/26* (2006.01)

(52) U.S. Cl. ...................................... 386/125; 386/124

(58) Field of Classification Search .................. 386/95, 386/124, 125, 52, 46, 45, 109
See application file for complete search history.

(56) References Cited

U.S. PATENT DOCUMENTS

| | | | |
|---|---|---|---|
| 5,636,200 A | 6/1997 | Taira et al. | |
| 5,854,873 A | 12/1998 | Mori et al. | |
| 5,895,124 A | 4/1999 | Tsuga et al. | |
| 6,243,086 B1 | 6/2001 | Kawamukai et al. | |
| 2004/0223743 A1* | 11/2004 | Seo et al. .................... | 386/95 |
| 2005/0254363 A1 | 11/2005 | Hamada et al. | |
| 2008/0253733 A1* | 10/2008 | Kang et al. .................... | 386/46 |

FOREIGN PATENT DOCUMENTS

| | | |
|---|---|---|
| EP | 0 685 845 A2 | 12/1995 |
| EP | 0 788 101 A1 | 8/1997 |
| EP | 0 847 195 A1 | 6/1998 |
| JP | 11-110950 | 4/1999 |
| JP | 2002-216160 | 8/2002 |
| WO | WO 2004/079736 | 9/2004 |
| WO | WO 2004/098183 A1 | 11/2004 |

OTHER PUBLICATIONS

International Search Report issued Dec. 30, 2005 by WIPO in International Application No. PCT/KR2005/003992.
Office Action issued Jun. 5, 2009 by the Chinese Patent Office in CN Application No. 200580042141.9.
Extended Search Report issued Aug. 31, 2009 by the European Patent Office in EP Patent Application No. 05818889.7-2223.

* cited by examiner

*Primary Examiner*—Robert Chevalier
(74) *Attorney, Agent, or Firm*—Harness, Dickey & Pierce, P.L.C.

(57) ABSTRACT

A structure of navigation information for video data recorded on a recording medium and recording and reproducing methods and apparatuses using the structure. The method of recording video data in accordance with the present invention records video data on a recording medium with organizing the video data into navigation units and interleaving navigation units of different reproduction paths with one another in multiple reproduction path segments. An information entry is created for each navigation unit and the information entry comprises information indicating whether the associated-navigation unit is in a multiple reproduction path segment and information for identifying the reproduction path to which the associated navigation unit belongs.

19 Claims, 8 Drawing Sheets

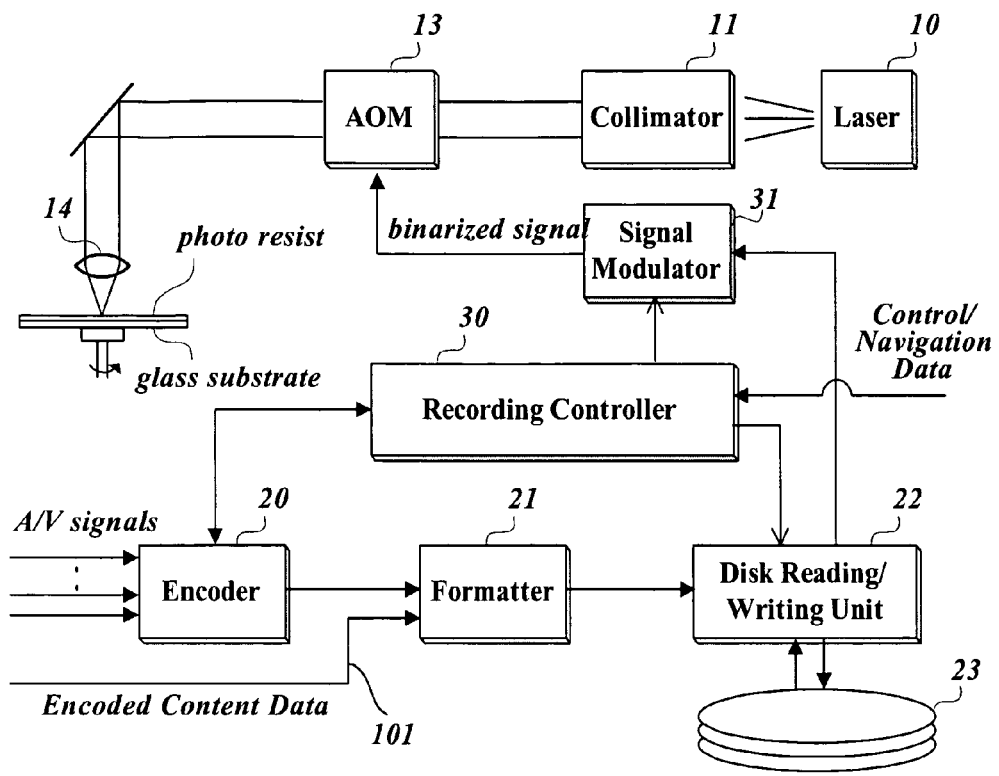
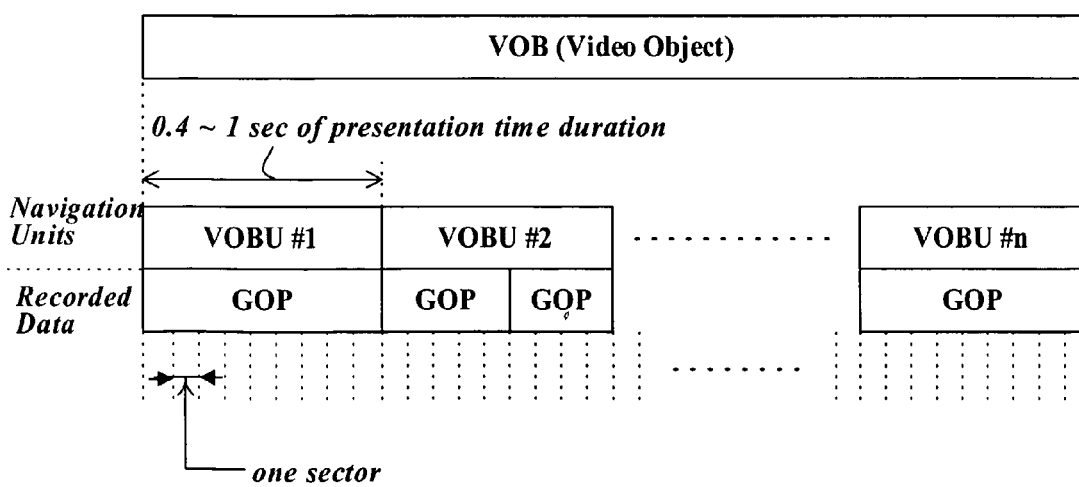

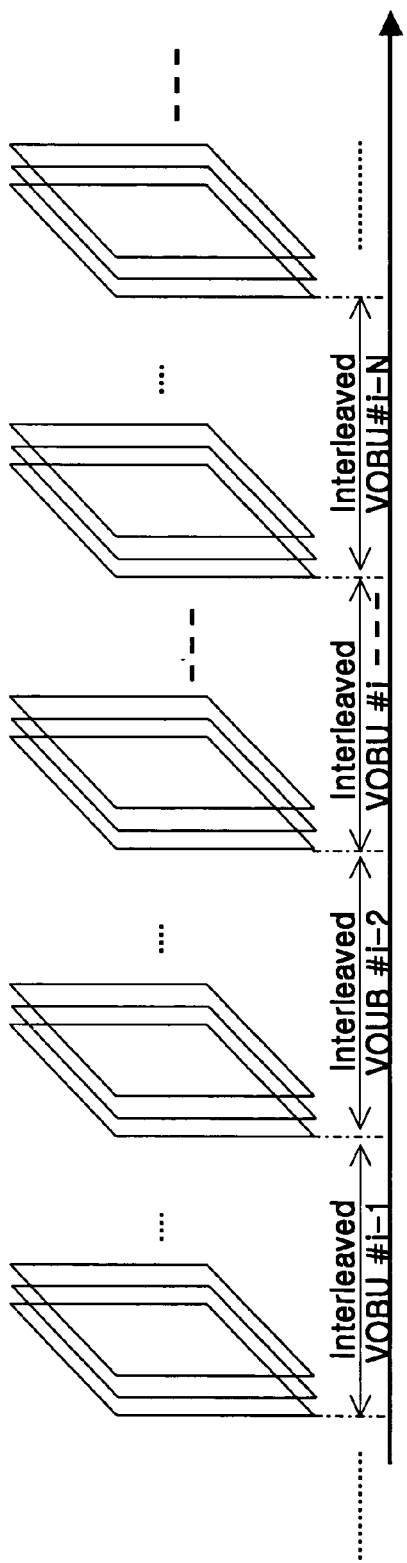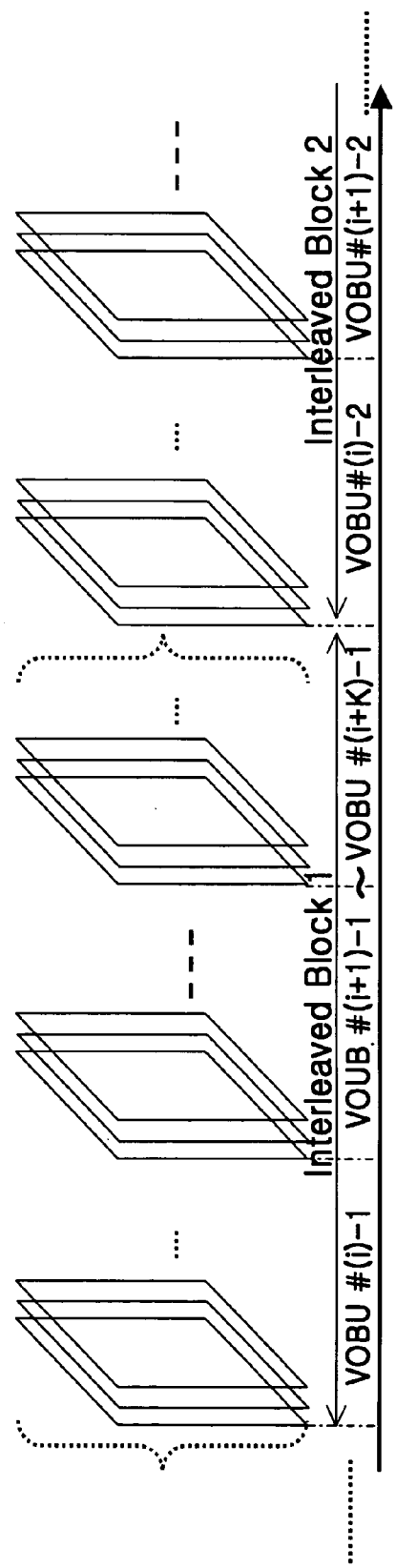

FIG. 5
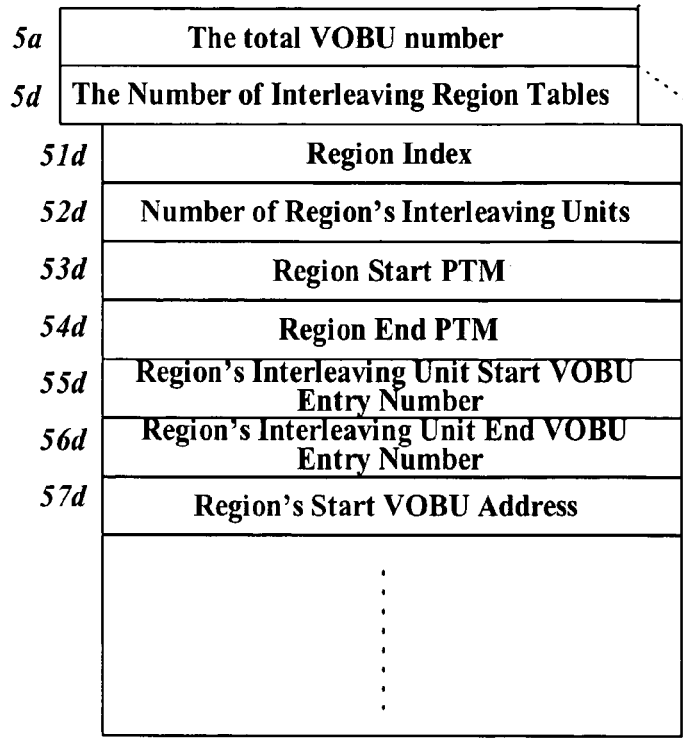
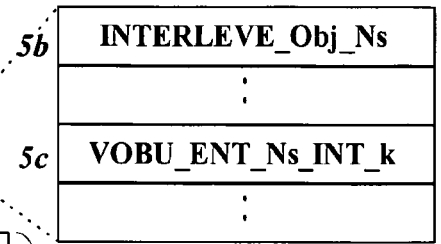
FIG. 6
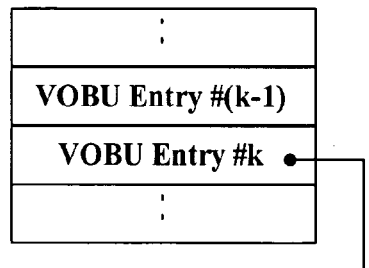

FIG. 8b

| | |
|---|---|
| 8a | The Number of Parent Info. Tables |
| 81a | Table(Region) Index |
| 82a | Region's Parent Level (1,2,...,or 8) |
| 83a | Region Start PTM |
| 84a | Region End PTM |
| 88a | Region's Interleaving Unit Start VOBU Entry Number |
| 86a | Region's Interleaving Unit End VOBU Entry Number |

*Region Information (Parental Info.) Table #1*

STRUCTURE OF NAVIGATION
INFORMATION FOR VIDEO DATA
RECORDED ON A RECORDING MEDIUM
AND RECORDING AND REPRODUCING
METHODS AND APPARATUSES USING THE
STRUCTURE

PRIORITY INFORMATION

This application claims priority under 35 U.S.C. §119 on Korean Patent Application No. 10-2004-0103494, filed on Dec. 9, 2004, the entire contents of which are hereby incorporated by reference.

BACKGROUND

1. Field of the Invention

This document relates to a structure of navigation information for video data having multiple reproduction paths or having reproduction regions of different parental levels recorded on a read-only recording medium and methods and apparatuses using the structure.

2. Description of the Related Art

The DVD-ROM, which is usually called the DVD, has a storage capacity of 4.7 GB and is commonly used as a storage medium for delivering high-quality digital contents such as movies.

TV stations currently broadcast in both analog and digital but only digital TV broadcast will be available in the near future. A digital broadcast provides better video quality over its analog counterpart. Viewers have a natural desire to enjoy movies of higher video quality than that of the DVD.

For this reason, read-only disks having higher storage capacity than the DVD are under development. Higher-capacity disks can provide viewers with high-quality contents in more various ways. For example, video data representing different camera angles may be recorded on a recording medium. As another example, different versions of a title or portions thereof associated with different parental levels may be recorded on the recording medium.

If video data representing different camera angles is recorded on a recording medium, more than one video segment may have the same presentation time because there are multiple reproduction paths associated with different angles. In this case, a multiple reproduction data region and a segment representing an angle included therein have different data sizes but have the same the playback time duration. This may result in problems in interval skip or search operations during reproduction.

SUMMARY OF THE INVENTION

In view of the shortcomings of the conventional art, it is one object of the present invention to provide a structure for navigation information that allows effective identification and management of data regions having multiple reproduction paths recorded on a recording medium and recording and reproducing methods and apparatuses using the structure.

It is another object of the present invention to provide a structure for navigation information that allows effective identification and management of data regions having different parental levels recorded on a recording medium and recording and reproducing methods and apparatuses using the structure.

The method of recording video data in accordance with the present invention records video data on a recording medium by organizing the video data into navigation units and interleaving navigation units of different reproduction paths with one another in multiple reproduction path segments. An information entry is created for each navigation unit and the information entry comprises information indicating whether the associated navigation unit is in a multiple reproduction path segment and information for identifying the reproduction path to which the associated navigation unit belongs.

The present invention creates and records region information that divides multiple reproduction path video data into regions based on changes in the number of reproduction paths. The region information comprises information on the number of navigation units in the video data, information on the number of the regions, and table entries having information on the regions, one table entry being associated with one region and the number of the table entries being equal to the number of the regions.

The present invention records video data having segments of different parental levels on a recording medium with organizing the video data into navigation units and creates and records region information that divides the video data into regions based on changes in the parental level in the video data. The region information comprises information on the number of the regions and table entries having information on the regions, one table entry being associated with one region and the number of the table entries being equal to the number of the regions.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 1 illustrates a block diagram of an apparatus for manufacturing read-only recording media having navigation information according to the present invention thereon;

FIG. 2 illustrates an example of the process of recording video data by organizing the video data into navigation units;

FIGS. 3a and 3b illustrate examples of the method for interleaving navigation units of multiple reproduction path regions;

FIG. 5 illustrates the structures of the region information table and region general information according to the present invention;

FIG. 6 illustrates the structure of a VOBU entry recorded according to the present invention;

FIG. 8b illustrates the structure of region information created for the example shown in FIG. 8a according to the present invention.

DETAILED DESCRIPTION OF THE PREFERRED EMBODIMENTS

Figure 4:
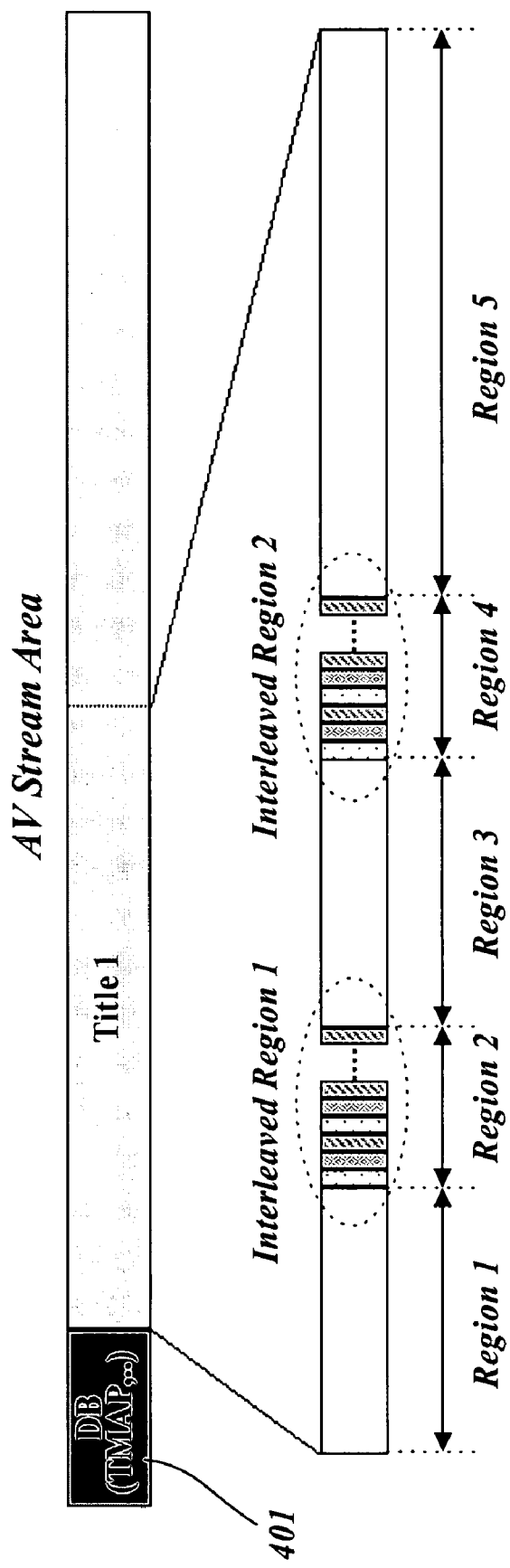
FIG. 4 illustrates an example of a recorded title having multiple reproduction paths and regions thereof recorded according to the present invention.

In order that the invention may be fully understood, several embodiments thereof will now be described with reference to the accompanying drawings.

FIG. 1 is a block diagram of an apparatus for manufacturing read-only optical disks having the navigation data in accordance with the present invention thereon. The apparatus comprises a laser diode 10 for generating a laser beam, a collimator 11 for collimating the generated laser beam, an optical modulator 13 also ("AOM") for passing or blocking the parallel beam from the collimator 11 depending on the level of a modulated input signal (e.g., EFM signal), a condensing lens 14 for concentrating the beam from the optical modulator 13 on a photosensitive layer (e.g., photo resist) located on a glass substrate, an encoder 20 for encoding input content data in the MPEG format, a formatter 21 for formatting the encoded data into error correcting code ECC block data suitable for recording, a high-capacity storage medium 23 (e.g., hard disk drive) for storing data, a disk reading/writing unit 22 for reading/writing data from/to the storage medium 23, a signal modulator 31 for modulating data stored in the storage medium 23 into a binary signal such as EFM signal for recording on a disk, and a recording controller 30 for processing user input, for creating navigation data for contents being recorded, and for controlling the irradiation of the laser beam on the photosensitive layer.

To produce a read-only disk using the apparatus shown in FIG. 1, it is required to write content data to be recorded on the read-only disk and navigation data for the content data to the storage medium 23. The data stored therein is read under the control of the recording controller 30 and then modulated into a binary signal by the signal modulator 31. The optical modulator 13 passes or blocks the collimated laser beam depending on the level of the modulated signal, thereby forming a pit train corresponding to the modulated signal on the photosensitive layer located on the glass substrate. Controlled by the recording controller 30, the condensing lens 14 moves outward slowly during the pit-forming process, thereby making the pit train be a spiral pattern. The pit train represents data corresponding to the content data and navigation data therefor stored in the storage medium 23. A stamper is made using the photosensitive layer having the pit train thereon and read-only disks storing the content data and navigation data according to the present invention are manufactured using the stamper.

Because the content data and navigation data stored in the storage medium 23 are directly mapped to the read-only disk, the method of writing data to the storage medium 23 according to the invention will now be described.

An input video signal is encoded in a particular format (e.g., MPEG) by the encoder 20 and converted into ECC blocks by the formatter 21 and then written to the storage medium 23 by the reading/writing unit 22. Also, a data stream pre-encoded by another apparatus can be provided from another storage medium 101.

The encoder 20 encodes input data into GOPs each of which comprises a leading I-picture and possibly more pictures. As shown in FIG. 2, the recording controller 30 organizes one or more successive GOPs into a navigation unit such that the playback time duration thereof is between 0.4 and 1 second and creates navigation information for the navigation unit. Information necessary for the creation of the navigation units is provided by the encoder 20. A navigation unit is called a VOBU (video object unit) and the recorded data corresponding to a title is called a VOB (video object). Each navigation unit is aligned with sectors and recorded in the data area of the storage medium 23, each sector having a size of 2048 bytes. The fact that each navigation unit is recorded in the data area of the storage medium 23 means that the data written to the storage medium 23, which will be recorded as pits on the read-only disk, will be mapped to the data area of the read-only disk.

If the data to be recorded has multiple reproduction paths (e.g., multiple angles), the recording controller 30 controls the encoder 20 to encode data of each reproduction path separately and interleaves the encoded data of each reproduction path, data of each reproduction path being provided individually. The interleave unit may be a VOBU as shown in FIG. 3a or multiple VOBUs as shown in FIG. 3b. The determination of each multiple reproduction path segment and information for the reproduction path needed for creating navigation units are received from a user through a user interface such as GUI (graphical user interface) preprogrammed in the recording controller 30.

If a multiple reproduction path segment is specified, the recording controller 30 organizes single reproduction path data prior to the multiple reproduction path segment as a single region and creates a region information table therefor. If the multiple reproduction path segment ends and single reproduction path data begins, the recording controller 30 organizes the multiple reproduction path segment as a single region and creates a region information table therefor. In other words, each time the number of reproduction paths changes, the recording controller 30 organizes the data segment that has been received prior to the change as a region and creates region information table for the region. If the recording operation ends, the reproducing controller 30 organizes the last segment as a region and creates a region information table for the region. In FIG. 4, for example, Title 1 is organized into 5 regions and 5 region information tables are created. After all the region information tables have been recorded, the recording controller 30 creates and records region general information.

FIG. 5 shows the structures of region information table and region general information.

The region general information includes the total number of VOBUs 5a and the number of region information tables 5d. The number of region information tables indicates the number of regions included in the recorded data. The region general information may include the maximum number of interleaved blocks contained in the multiple reproduction path segments 5b and the number of VOBUs contained in each reproduction path 5c instead of the total number of VOBUs 5a. The maximum number of interleaved blocks contained in the multiple reproduction path segments indicates the maximum number of reproduction paths.

Each region information table includes a region index 51d, the number of interleaved blocks 52d, which indicates a single reproduction path region if set to 1, the start PTM 53d and end PTM 54d of the region, the start VOBU entry number 55d and the end VOBU entry number 56d in the region, and the start VOBU address 57d in the region. A VOBU entry is the element of a time map created in accordance with the invention. Since a map entry corresponds to a VOBU, the map entry is called the VOBU entry. The time map in accordance with the invention will be described later.

As shown in FIG. 4, the navigation information shown in FIG. 5 is written in a database area 401, which is positioned in front of the area in which the content data is written and stores management information. The fact that the navigation information is written in the database area 401 means that the data stored in the database area 401 of the storage medium 23 will be mapped to the database area of the read-only recording medium.

Each time a VOBU is assigned in the data stream being recorded, the recording controller 30 creates a VOBU entry for the VOBU. The created VOBU entry is recorded in the time map. The VOBU entry includes information on the size and playback time duration of the corresponding VOBU and thus allows presentation time based search operations, which explains why the map is called the time map.

FIG. 6 shows the structure of a VOBU entry created in accordance with the present invention. As shown, a VOBU entry includes a flag indicating whether the associated VOBU belongs to a multiple recording path segment 6a, the reproduction path number (e.g., angle number) to which the associated VOB pertains 6b, the number of VOBUs to the next interleaved block (i.e., the block of another reproduction path) 6c, the number of video/audio packs in the interleaved block to which the associated VOB belongs 6d, the number of video fields (frames) in the associated VOBU 6e, and the number of video/audio packs contained in the associated VOBU 6f. The number of fields (frames) 6e represents the playback time duration because the number of fields (frames) per second is predetermined. The number of video/audio packs 6f represents the size of the VOBU.

Figure 7:
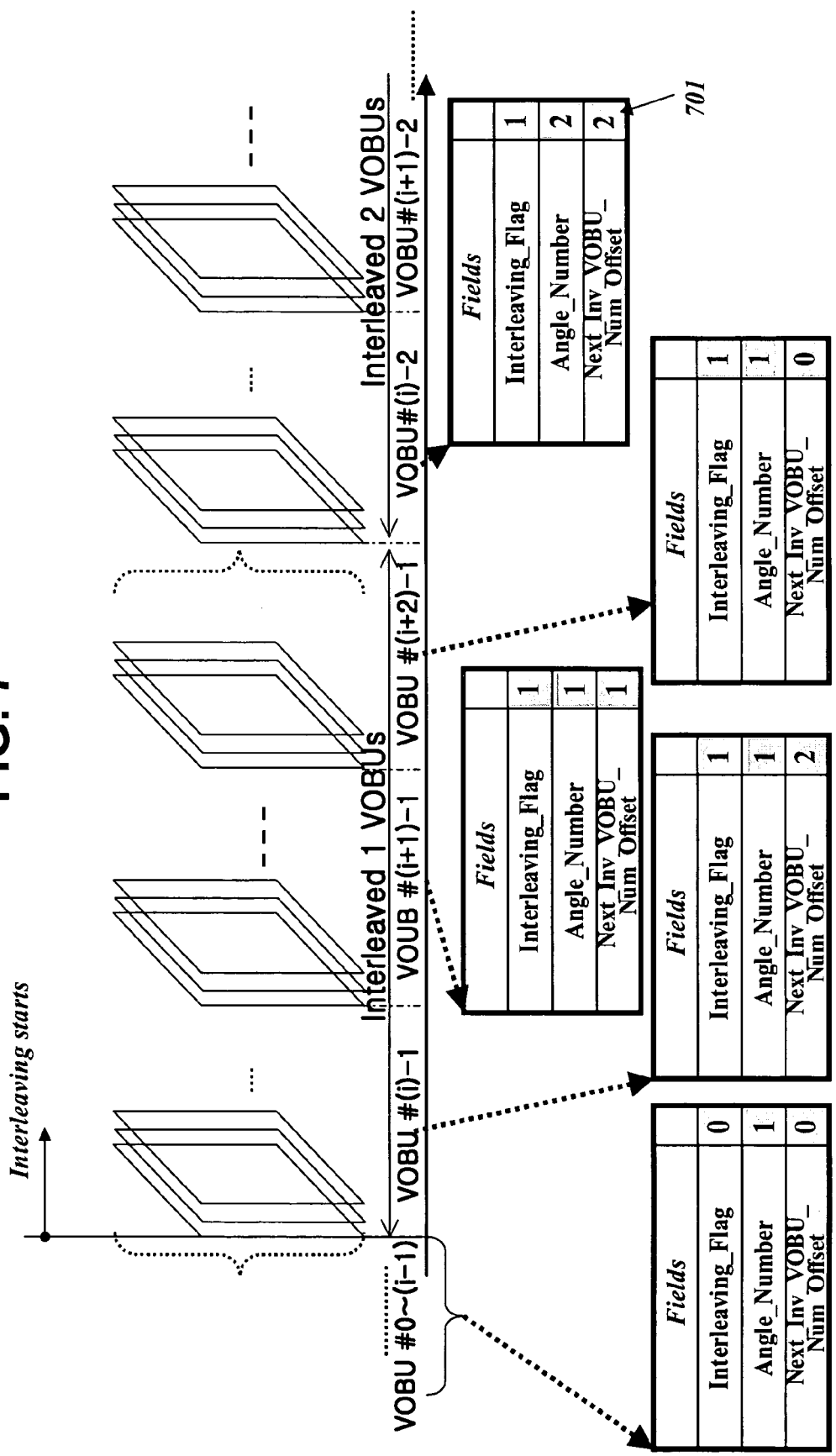
FIG. 7 illustrates several major fields of the VOBU entry according to the present invention.

FIG. 7 illustrates an example of several important fields of the VOBU entry shown in FIG. 6, wherein one interleave unit comprises 3 VOBUs as shown in FIG. 3b. Because VOBUs preceding VOBU #(i−1) and VOBU #(i−1) do not represent multiple reproduction path data, they are not interleaved and thus the flag 6a (interleaving_flag) is set to '0'. The flag 6a (interleaving_flag) of the following VOBUs, i.e., 3 VOBUs for angle 1 and 1 VOBU for angle 2, is all set to '1'. The Next_Inv_VOBU_Num_Offset field represents the number of VOBUs existing between the current VOBU and the first VOBU of the next interleaved block. Because there are two VOBUs between VOBU #(i)−1, the first VOBU of the interleaved block for angle 1, and VOBU #(i)−2, the first VOBU of the interleaved block for angle 2, the Next_Inv_VOBU_Num_Offset field of VOBU #(i)−1 is written to '2'. Likewise, the Next_Inv_VOBU_Num_Offset field of VOBU #(i+1)−1 is written to '1'. Because VOBU #(i+2)−1 is immediately followed by VOBU #(i)−2, the Next_Inv_VOBU_Num_Offset field thereof is written to '0'. The Next_Inv_VOBU_Num_Offset field of VOBU#(i)−2, which is the first VOBU of the interleave unit for angle 2, is written to '2' because one interleave unit comprises 3 VOBUs. However, if the video data has only two reproduction paths, e.g., angle 1 and angle 2, The Next_Inv_VOBU_Num_Offset field of VOBU #(i)−2 is written to '0'.

Figure 8A:
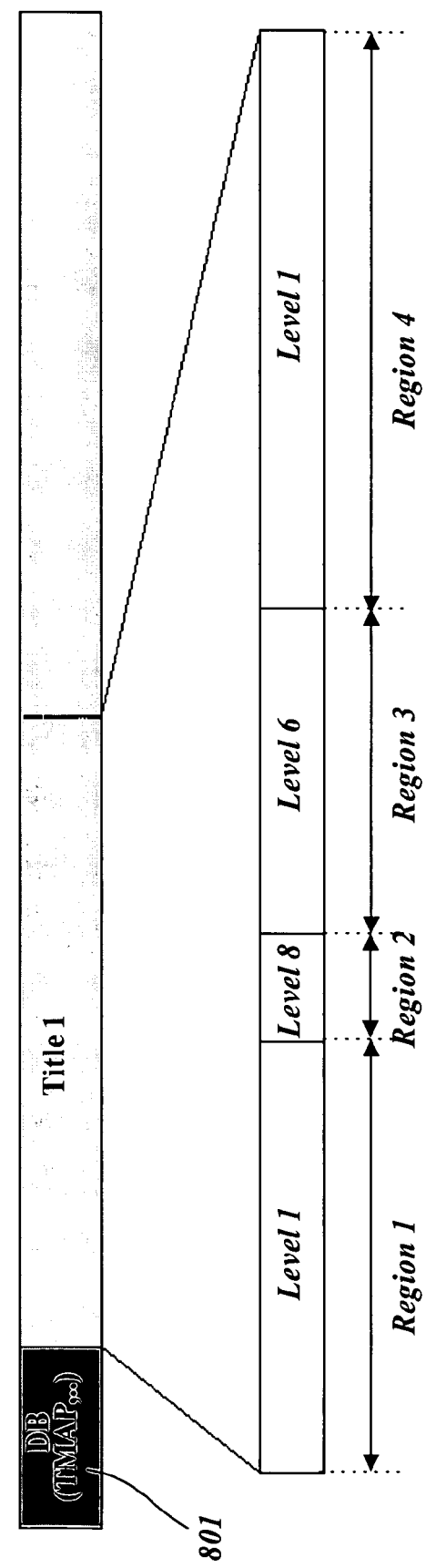
FIG. 8a illustrates an example of a recorded title having multiple parental levels and regions thereof recorded according to the present invention.

In addition to recording multiple reproduction path content data and the navigation information therefor, the apparatus shown in FIG. 1 may record content data comprising segments of different parental levels. The parental level of each segment is determined by information provided by the user. Each time the parental level is changed, the recording controller 30 organizes the data received thus far as a region and creates a region information table for the region before starting a new region with a different parental level. FIG. 8a shows an example of content data recorded in the data area of the storage medium 23, the recorded data being organized as different regions according to the parental level. FIG. 8b shows an exemplary structure of the created region information. As in the case of navigation information for multiple reproduction path data, the navigation information for content having multiple parental levels is written in the database area 801 shown in FIG. 8a.

In case of the recorded data shown in FIG. 8a, 4 region information tables are created in the region general information as shown in FIG. 8b. The region information structure shown in FIG. 8b includes the number of region information tables (parental information tables) 8a as general information. Each region information table includes the table index (region index) 81a, parental level of the region 82a (a value between 1 and 8), the start PTM 83a and the end PTM 84a of the region, and the start VOBU entry number 85a and the end VOBU entry number 86a.

The method of reproducing a read-only recording medium (e.g., HD-DVD) having content data stored in its data area as shown in FIG. 4 or FIG. 8a and navigation information stored in its database area as shown in FIGS. 5 and 6 or 8b will now be described.

Figure 9:
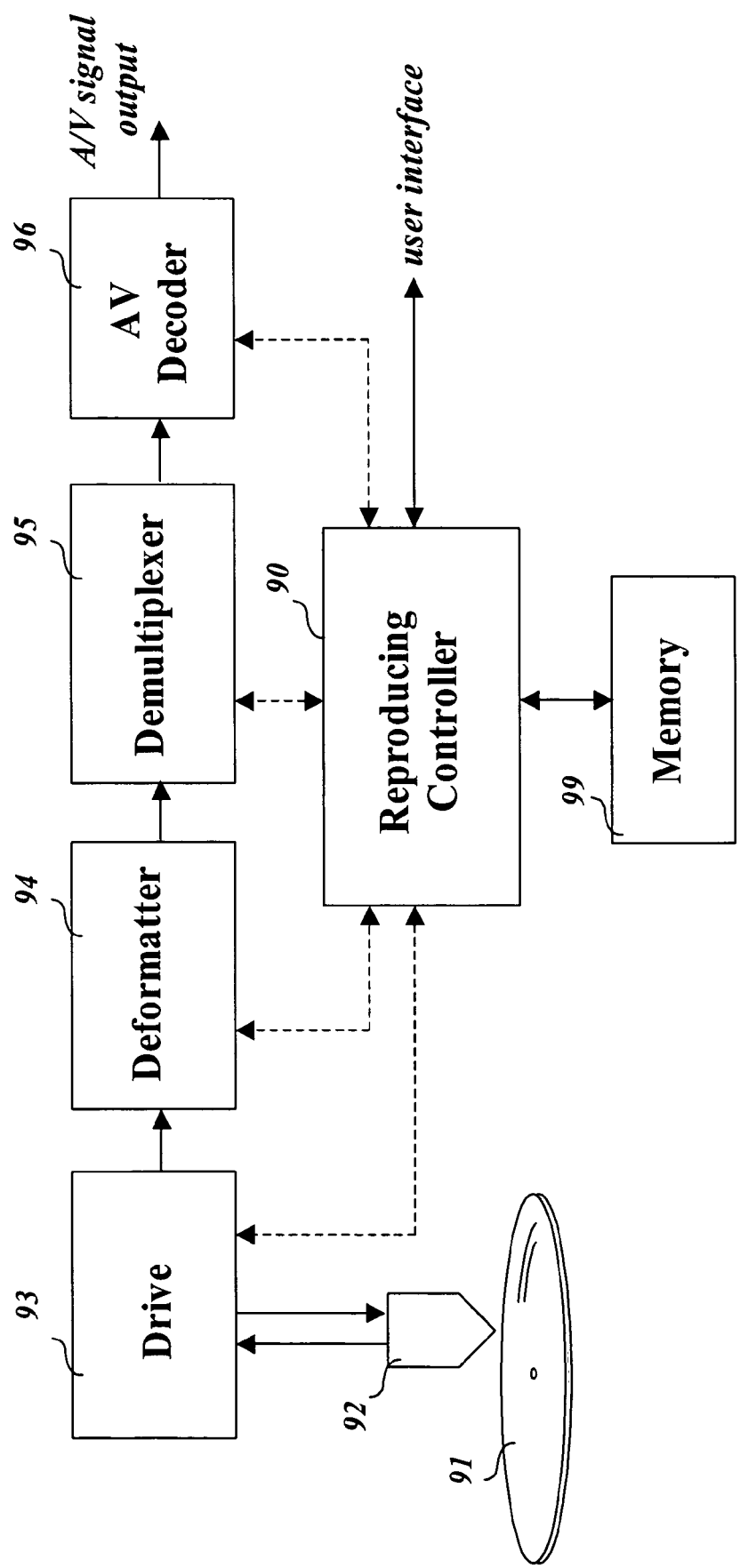
FIG. 9 illustrates a block diagram of an apparatus for reproducing a read-only recording medium having the data structure according to the present invention.

FIG. 9 is a block diagram of an apparatus for reproducing a read-only recording medium 91 having the data structure according to the present invention. If data reproduction is requested, a reproducing controller 90 controls a driver 93 so that an optical pickup 92 can read the aforementioned data structure. First of all, the navigation information including the information shown in FIG. 5 and FIG. 6 or FIG. 8b is loaded into a memory 99 for reproduction of the recorded data. Based on the loaded navigation information and user input received through user interface (e.g., buttons on the apparatus, remote controller, etc), the reproducing controller 90 controls the drive 93 to read a recorded title from the recording medium 91. The user input may specify the recorded title to read, which is managed as a VOB by the navigation information. The user input may be entered through a graphical user interface pre-programmed in the reproducing controller 90. The reproducing controller 90 controls the reproduction of the specified title with reference to the user input and the loaded navigation information.

A deformatter 94 receives a data stream read by the driver 93 and the optical pickup 92 and provides the data to a demultiplexer 95 after performing error correction operations. The demultiplexer 95 demultiplexes the input data stream into audio and video data. An A/V decoder 96 retrieves original video and audio signals by decoding the video and audio data. During the reproduction process, the operation of the deformatter 94, demultiplexer 95, and A/V decoder 96 is supervised by the reproducing controller 90.

In the case of a random playback or search operation of multiple reproduction path content, the reproducing controller 90 accesses a specific VOBU based on the time map information shown in FIG. 6 and loaded to the memory 99. For example, if the user requests an angle switch from the current angle (e.g., angle 1) to angle 2, the reproducing controller 90 accesses the start VOBU of angle 2 by skipping data by the sum of the values of the VOBU_SZ field of VOBUs located prior to the VOBU having the Angle_Number field of 2. Instead of looking for the VOBU having the Angle_Number field of 2, the reproducing controller 90 may add the values of the VOBU_SZ field of VOBUs the number of which is the value of the Next_Inv_VOBU_Num_Offset field written in the entry of the VOBU currently being played.

Based on the region information as shown in FIG. 5, the reproducing controller 90 may show the information on the current region (e.g., the number of reproduction paths, the playback time duration of each reproduction path, etc) to the user or utilize the information in the case of skipping data. For example, if the user requests to skip the current multiple reproduction region during the playback of a VOBU within the region, the reproducing controller 90 can makes a jump to the next region with reference to the value of the 'Region's Start VOBU Address' field of the next region information table. This is just one example of many possible applications using the navigation information shown in FIGS. 5 and 6 and thus there can be more variations.

In the case where A/V data of multiple parental levels is recorded on the read-only recording medium 91, the reproducing controller 90 may show the parental level of each region or switch between parental levels based on the parental level information table shown in FIG. 8*b*.

At least one embodiment of the present invention explained above allows rapid search operations with no error on content data having multiple reproduction paths or different parental levels within the content data recorded on a read-only recording medium.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A recording medium storing video data and navigation information thereof, wherein
   the video data is organized into a plurality of navigation units and includes at least one multiple reproduction path segment, the multiple reproduction path segment including at least one navigation unit pertaining to each reproduction path; and
   the navigation information includes an information entry for each navigation unit and the information entry comprises information indicating whether an associated navigation unit is in a multiple reproduction path segment, information for identifying a reproduction path to which the associated navigation unit belongs, number of navigation units existing between the associated navigation unit and a first navigation unit of a following data block of a different reproduction path, size of navigation units pertaining to a reproduction path to which the associated navigation unit belongs, presentation duration of the associated navigation unit, and size of the associated navigation unit.

2. The recording medium of claim 1, wherein the navigation information includes region information that divides the video data into regions based on changes in number of reproduction paths.

3. The recording medium of claim 2, wherein the region information comprises information on number of navigation units in the video data, information on number of the regions, and table entries having information on the regions, each table entry being associated with one region and number of the table entries being equal to number of the regions.

4. The recording medium of claim 3, wherein the table entry comprises an associated region number, number of reproduction paths included in a video segment of an associated region, start presentation time and end presentation time of the associated region, information entry number for a start navigation unit of the associated region and information entry number for an end navigation unit of the associated region, and an address of the start navigation unit of the associated region.

5. The recording medium of claim 3, wherein the information on number of navigation units in the video data is given by total number of reproduction paths in the video data and number of navigation units belonging to each reproduction path.

6. The recording medium of claim 1, wherein navigation units in the multiple reproduction path segment are interleaved such that one navigation unit of a reproduction path is followed by one navigation unit of a different reproduction path.

7. The recording medium of claim 1, wherein navigation units in the multiple reproduction path segment are interleaved such that a plurality of navigation units of a reproduction path is followed by a plurality of navigation units of a different reproduction path.

8. A method of recording video data on a recording medium, comprising the steps of:
   (a) recording video data having multiple reproduction paths on the recording medium while organizing the video data into navigation units and interleaving navigation units with one another in multiple reproduction path segments such that at least one navigation unit of a reproduction path is followed by at least one navigation unit of a different reproduction path; and
   (b) creating navigation information for the recorded video data and recording the navigation information on the recording medium,
   wherein the navigation information includes an information entry for each navigation unit and the information entry comprises information indicating whether an associated navigation unit is in a multiple reproduction path segment, information for identifying a reproduction path to which the associated navigation unit belongs, number of navigation units existing between the associated navigation unit and a first navigation unit of a following data block of a different reproduction path, size of navigation units pertaining to a reproduction path to which the associated navigation unit belongs, presentation duration of the associated navigation unit, and size of the associated navigation unit.

9. The method of claim 8, wherein the navigation information includes region information that divides the video data into regions based on changes in number of reproduction paths, and the region information comprises information on total number of navigation units in the video data, information on number of the regions, and table entries having information on the regions, each table entry being associated with one region and number of the table entries being equal to number of the regions.

10. The method of claim 9, wherein the table entry comprises an associated region number, number of reproduction paths included in a video segment of an associated region, start presentation time and end presentation time of the associated region, information entry number for a start navigation unit of the associated region and information entry number for an end navigation unit of the associated region, and an address of the start navigation unit of the associated region.

11. The method of claim 8, wherein the recording medium has the video data and navigation data as prepits formed on surface of the recording medium, the video data and navigation data being recorded by the steps (a) and (b).

12. An apparatus for recording video data and navigation information thereof on a recording medium, comprising:
   recording means configured to record signals on the recording medium;
   a formatter configured to reconstruct video data having multiple reproduction path segments into data suitable to recording according to recording format of the recording medium and to provide the recording-formatted data to the recording means; and
   a controller configured to organize the video data into navigation units and to create an information entry for each navigation unit and to control the recording means to record the created information entry for each navigation unit on the recording medium, wherein the information entry comprises information indicating whether an associated navigation unit is in a multiple reproduction path segment, information for identifying a reproduction path to which the associated navigation unit belongs, number of navigation units existing between the associated navigation unit and a first navigation unit of a following data block of a different reproduction path, size of navigation units pertaining to a reproduction path to which the associated navigation unit belongs, presentation duration of the associated navigation unit, and size of the associated navigation unit.

13. The apparatus of claim 12, wherein the controller is configured to divide the video data into regions based on changes in number of reproduction paths, to create information on the regions, and to control the recording means to record the created information on the recording medium, and the information on the regions comprises information on total number of navigation units in the video data, information on number of the regions, and table entries having information on the regions, each table entry being associated with one region and number of the table entries being equal to number of the regions.

14. The apparatus of claim 13, wherein the table entry comprises an associated region number, number of reproduction paths included in the video segment of an associated region, start presentation time and end presentation time of the associated region, information entry number for a start navigation unit of the associated region and information entry number for an end navigation unit of the associated region, and an address of the start navigation unit of the associated region.

15. The apparatus of claim 12, wherein the recording medium includes a photosensitive layer on its surface and the recording means are configured to form pits corresponding to an input signal on the photosensitive layer.

16. A method of reproducing video data from a recording medium, comprising the steps of:

(a) reading navigation information for the video data from the recording medium;

(b) reading a navigation unit in a multiple reproduction path segment of the video data from the recording medium based on first and second information contained in an information entry for each of navigation units into which the video data is organized, the information entry being contained in the navigation information; and (c) locating a start position of a region based on region information that divides the video data into regions based on changes in number of reproduction paths and reading data from the start position, the region information being included in the navigation information, wherein the first information indicates whether an associated navigation unit is in a multiple reproduction path segment and the second information identifies a reproduction path to which the associated navigation unit belongs, and the information entry comprises presentation duration of the associated navigation unit, and size of the associated navigation unit.

17. The method of claim 16, wherein the region information comprises information on number of navigation units in the video data, information on number of the regions, and table entries having information on the regions, each table entry being associated with one region and number of the table entries being equal to number of the regions.

18. An apparatus for reproducing video data from a recording medium, comprising:

a driver configured to drive optical reproduction means for reproducing data recorded on the recording medium;

a decoder configured to decode the video data read by the optical reproduction means;

a storage unit configured to store navigation information of the video data read by the optical reproduction means; and a controller configured to read a navigation unit in a multiple reproduction path segment of the video data from the recording medium through the optical reproduction means by controlling the driver based on first and second information contained in an information entry for each of navigation units into which the video data is organized, the information entry being contained in the navigation information stored in the storage unit, wherein the controller is further configured to perform a task of locating a start position of a region based on region information, that divides the video data into regions based on change in number of reproduction paths, and reading data from the start position through the optical reproduction means by controlling the driver, wherein the first information indicates whether an associated navigation unit is in a multiple reproduction path segment and the second information identifies a reproduction path to which the associated navigation unit belongs, and the information entry comprises presentation duration of the associated navigation unit, and size of the associated navigation unit.

19. The apparatus of claim 18, the region information comprises information on total number of navigation units in the video data, information on number of the regions, and table entries having information on the regions, each table entry being associated with one region and number of the table entries being equal to number of the regions.

* * * * *